United States Patent [19]
Kambe et al.

[11] Patent Number: 5,723,925
[45] Date of Patent: Mar. 3, 1998

[54] SUPERCONDUCTOR MOTOR PROVIDED WITH SUPERCONDUCTOR SHIELD

[75] Inventors: Yoshitaka Kambe, Seto; Tamio Shinozawa, Anjo, both of Japan

[73] Assignee: Toyota Jidosha Kabushiki Kaisha, Japan

[21] Appl. No.: 633,316

[22] Filed: Apr. 17, 1996

[30] Foreign Application Priority Data

May 15, 1995 [JP] Japan .................. 7-115544

[51] Int. Cl.$^6$ .................. H02K 55/00; H02K 23/00
[52] U.S. Cl. .................. 310/85; 310/86
[58] Field of Search .................. 310/10, 85, 86, 310/268

[56] References Cited

U.S. PATENT DOCUMENTS

| | | | |
|---|---|---|---|
| 3,402,307 | 9/1968 | Pearl .................. | 310/10 |
| 3,427,482 | 2/1969 | Massar .................. | 310/10 |
| 3,469,121 | 9/1969 | Smith .................. | 310/40 |
| 3,564,307 | 2/1971 | Kawabe et al. .................. | 310/10 |
| 3,673,444 | 6/1972 | Kawabe et al. .................. | 310/10 |
| 4,237,391 | 12/1980 | Schur et al. .................. | 310/10 |
| 4,385,246 | 5/1983 | Schur et al. .................. | 310/10 |
| 4,882,509 | 11/1989 | Wottlin .................. | 310/10 |
| 5,250,861 | 10/1993 | Cummins .................. | 310/10 |
| 5,325,002 | 6/1994 | Rabinowitz et al. .................. | 310/10 |

FOREIGN PATENT DOCUMENTS

| | | | |
|---|---|---|---|
| 63-314163 | 12/1988 | Japan .................. | H02K 55/04 |
| 64-81674 | 3/1989 | Japan .................. | H02N 11/00 |
| 7-15936 | 1/1995 | Japan .................. | H02K 31/02 |
| A-1-014527 | 12/1965 | United Kingdom .................. | H02K 3/02 |

OTHER PUBLICATIONS

Patent Abstracts of Japan, vol. 95, No. 001 of JP-A-07 015936 (Aisin Seiki Co. Ltd.), Jan 17, 1995.
European Search Report dated Jan. 9, 1997 (2 pages).
Communication dated Jan. 15, 1997 (1 page).

*Primary Examiner*—Thomas M. Dougherty
*Assistant Examiner*—B. Mullins
*Attorney, Agent, or Firm*—Finnegan, Henderson, Farabow, Garrett & Dunner, L.L.P.

[57] ABSTRACT

A solenoid coil generates a magnetic field within its bore when an electrical current is made to flow therethrough. A disc type rotor carrying thereon an armature coil is arranged in the bore along with a superconductor shield partly covering the disc type rotor. The magnetic field generated by the solenoid coil cannot pass through the superconductor shield and therefore detours around it and passes through an area devoid of the superconductor shield. The superconductor shield is also used to direct the electrical current flowing through the portions of the armature coil not covered by the superconductor shield, either from the periphery toward the center of the disc type rotor or conversely from the center toward the periphery thereof. With this arrangement, the Lorentz force applied to the radial electrical current is made to become a one-directional rotary force that drives the disc type rotor to rotate.

7 Claims, 13 Drawing Sheets

MAGNETIC FIELD B

Fig. 3

MAGNETIC FIELD B ⊙

SUPERCONDUCTOR MOTOR PROVIDED WITH SUPERCONDUCTOR SHIELD

BACKGROUND OF THE INVENTION

1. Field of the Invention

This invention relates to a superconductor motor provided with a superconductor shield and comprising a field coil which is a solenoid coil and a rotor arranged within the bore of the coil.

2. Description of the Related Art

A variety of superconductor motors have been proposed. A superconductor motor comprises a superconductor coil that does not give rise to any copper loss (energy loss due to electrical resistance) and hence allows a large electric current to flow therethrough to generate a very strong magnetic field that drives the rotor arranged therein.

One category of superconductor motors are classified as single-pole disc type motors. A single-pole disc type motor comprises a conductive disc arranged in a magnetic field generated in a given direction by a solenoid coil. The conductive disc is fed with DC flowing radially by way of a pair of brush rings respectively held in contact with the periphery and the center of the disc. Thus, the DC flows through the conductive disc either from the center toward the periphery or conversely from the periphery toward the center. Then, as the magnetic field is applied to the conductive disc along its axis, a force perpendicular to the radial electric current is generated to rotate the disc. Basic explanations about the single-pole type motor are described in some books, such as in "Handbook for Superconductor Research and Development" edited by the International Superconductor Industrial Technology Research Center and "Handbook for Superconductor and Low Temperature Engineering" edited by the Low Temperature Engineering Association.

The single-pole type motor can be used as an armature coil having a very simple construction. While an armature coil substantially has a single current flow path, a relatively large rotary force can be obtained by using a superconductor coil for the solenoid coil and a strong magnetic field for the rotor.

However, there is a limit on the magnetic field intensity of a solenoid coil, and therefore, the power output of a single-pole type motor can only be raised by either increasing the flow of electrical current flowing through the conductive disc or using a larger conductive disc.

The use of a larger conductive disc inevitably increases the size of the motor. For a large electrical current to flow through a conductive disc, on the other hand, the contact resistance of the commutator and brush assembly has to be made sufficiently low. While the use of mercury for the commutator and brush assemblies may be effective for lowering the contact resistance, it entails problems of high cost and difficult handling. If a number of conductive discs are used to obtain a large power output, a corresponding number of mercury brush rings have to be provided.

Thus, there is a demand for small but powerful single-pole disc type motors.

SUMMARY OF THE INVENTION

It is therefore the object of the present invention to solve the above problems by providing a superconductor motor that is small but powerful, and has a simple construction.

According to the invention, this object is achieved by providing a superconductor motor comprising a solenoid coil as a field coil for generating a magnetic field within the bore of the coil by causing an electrical current to flow through the coil, a rotor arranged within the bore of the solenoid coil, an armature winding arranged on the rotor and a superconductor shield partly covering the armature winding along the axis of the rotor.

The component of the electrical current flowing through the part of the armature winding not covered by the superconductor shield radially toward the center of the rotor, and the component of the electrical current flowing radially and outwardly are differentiated and then the electrical current either toward the center or outwardly is substantially generated. A rotary force is generated as the Lorentz force resulting from the electrical current flowing in a radial direction and the magnetic field created by the solenoid coil.

By using a large number of turns of the armature winding, a desired torque can be obtained with such an arrangement, a large power output can be obtained with a small sized motor. Since the armature winding has a high impedance, the contact resistance of the commutator and brush assembly does not give rise to any significant problem so that the use of costly and sophisticated commutator and brush assemblies can be avoided.

The superconductor shield and the rotor are secured independently to make it easy to control the electric current so as to run through the armature winding on the rotor in a desired direction and produce a desired rotary force. The use of a superconductor shield independent from the rotor simplifies the profile and the preparation of the shield.

If the armature winding is so arranged that part of it runs radially and linearly while the remaining part runs along the circumference of the rotor, the rotor is provided with a rotary force as the Lorentz force generated as a result of the electrical current flowing radially and linearly. With this arrangement, a radially flowing electrical current can be controlled with ease.

If the superconductor shield is rotated synchronously with the rotor, the radial flow of the electric current running in the armature winding not covered by the superconductor shield can be constantly held in a given direction regardless of the revolution of the rotor to eliminate the necessity of switching the electrical supply to the armature winding and simplify the arrangement of the brushes.

For the purpose of the invention, the superconductor shield may be arranged on the rotor to constantly hold the radial flow of electrical current flowing in the part of the armature winding not covered by the superconductor shield to a given direction. This arrangement can eliminate the mechanism for driving the superconductor shield.

The superconductor shield is arranged on the rotor, and further, a stationary winding which supplies either the electric current directed toward the center of the rotor or the electrical current directed in the opposite direction is provided near the superconductor shield. Then, the rotor is driven to rotate as a result of the magnetic field generated by the solenoid coil and the magnetic field generated by the electric current flowing through the stationary winding near the superconductor shield.

With this arrangement, the rotary force of the rotor is produced by using the fixed winding, so the current supply mechanism of the motor is simplified.

A quadrangular stationary winding may be used for the purpose of the invention. With this arrangement, an electric current constantly running in a given direction can be obtained in the vicinity of the superconductor shield to simplify the components for supplying the current.

The superconductor shield may have a profile which is symmetrical relative to the axis of rotation of the rotor. In this case, the solenoid coil produces an evenly distributed magnetic field to prevent the rotor from wobbling on its axis.

The possible evaporation of the coolant due to the heat generated by the revolution of the rotor can be prevented by arranging the rotor outside the cryostat.

DETAILED DESCRIPTION OF THE PREFERRED EMBODIMENTS

Now, the present invention will be described by referring to the accompanying drawings illustrating preferred embodiments of the invention.

[1st Embodiment]

Figure 1:
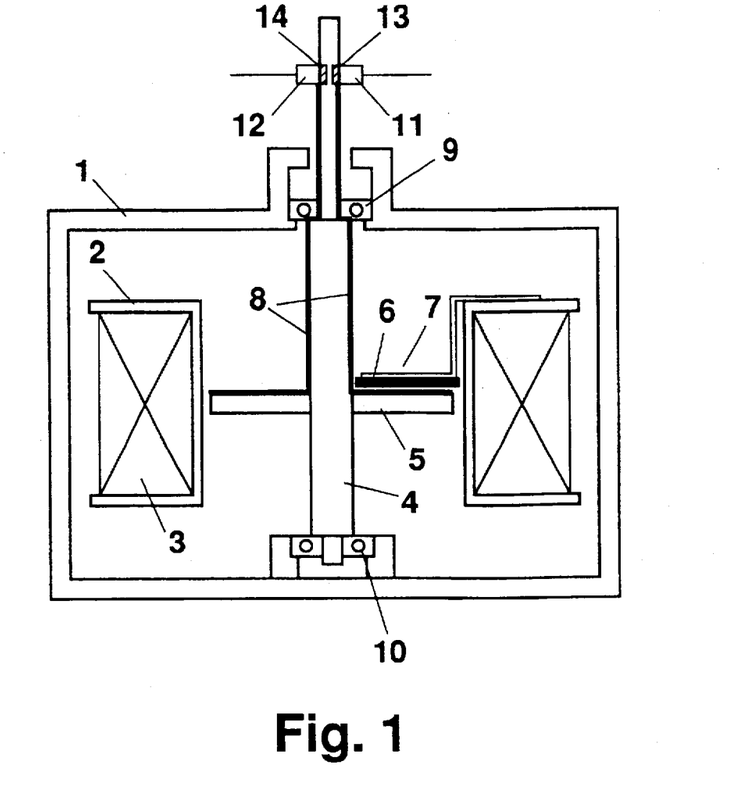
FIG. 1 is a schematic illustration of a first embodiment of the invention.

FIG. 1 is schematic view illustrating the overall configuration of a first embodiment. Cryostat 1 is a cylindrical and hermetically sealed container containing therein a cooling agent for cooling the superconductor components to a predetermined temperature. The coolant may be selected from liquefied helium, liquefied hydrogen, liquefied nitrogen, and so on, according to the temperature to be obtained by the coolant.

An annular bobbin 2 is arranged in the cryostat 1 and provided with a solenoid coil 3 wound around the bobbin 2. The bobbin 2 is formed by a pair of annular disc sections and a cylindrical section connecting them and having a diameter corresponding to the inner diameter of the annular discs. The solenoid coil is wound around the cylindrical section of the bobbin 2, which is rigidly secured by a support structure (not shown) and spaced apart from the inner surface of the cryostat 1.

The bobbin 2 is typically made of FRP (reinforced plastic), Al (aluminum) or SUS304 (formulated stainless steel with specified contents). The solenoid coil 3 is typically made of Nb—Ti (niobium-titanium) or a bismuth type superconductive material (Bi—Sr—Cu—Ca—O) and operates as a superconductor coil. An ordinary conductive coil may be used for the solenoid coil 3.

A motor output shaft 4 made of FRP or SUS034 is arranged in the cryostat 1, within the bore of the solenoid coil 3. A top portion of the shaft 4 projects upward from the cryostat 1. A disc type rotor 5 also made of FRP or SUS304 is fitted to the motor output shaft 4 at a middle position thereof (and also at a longitudinal middle position of the solenoid coil and within the bore of the coil).

Figure 2:
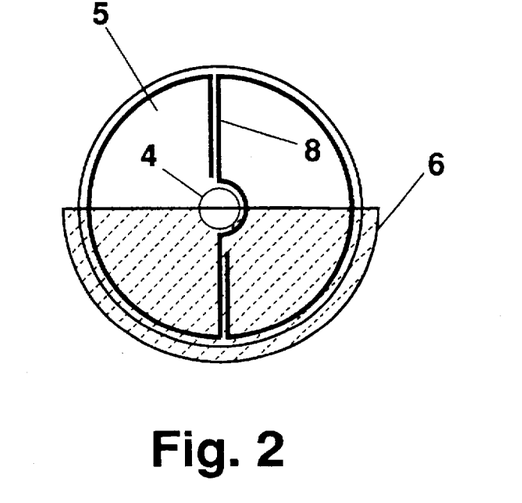
FIG. 2 is a schematic illustration of the armature coil and the superconductor shield of the first embodiment.

A semicircular superconductor shield 6 is arranged above and facing the right half of the disc type rotor 5 in FIG. 1. In FIG. 2, the superconductor shield 6 is shown as a shaded area. In this embodiment, the superconductor shield 6 is a film laminate comprising an Nb—Ti thin panel layer and an Al or Cu (copper) coating layer. The shield 6 is supported by a stand 7 that is anchored to the bobbin 2 at an end thereof. The stand 7 is also made of FRP or SUS304.

An armature winding 8 is arranged on the surface of the disc type rotor. As can be seen from FIG. 2, the armature winding starts running from the center to the periphery of the rotor, turns to run counterclockwise for half of the circumference of the rotor, turns back toward the center, passes around the center, reaches the periphery again and turns to the opposite direction to run clockwise for half of the circumference before it returns to the center of the rotor. The opposite ends of the armature winding 8 are brought up along the motor output shaft 4 (and to the outside of the cryostat 1). While only a single turn of the armature winding 8 is shown in FIG. 2, it may simply be repeated to produce a plurality of turns. While the armature winding 8 made of a superconductive material the same as that of the solenoid coil 3 in this embodiment, it may alternatively be made of an ordinary conductive material (non-superconductive).

The motor output shaft 4 is rotatably carried at an upper portion thereof by a bearing 9 and at the bottom by a bearing 10 disposed on the bottom wall of the cryostat 1. Note that the bearing 9 also operates as a sealing member for sealing the gap between the cryostat 1 and the motor output shaft 4 projecting upward through the top wall of the cryostat 1. The bearings 9, 10 are typically made of SUS 304 or a ceramic material.

A pair of brushes 11, 12 are arranged so as to face with the motor output shaft 4 disposed therebetween at a top portion of the shaft. They are held in contact with respective commutators 13, 14 fitted to the surface of the motor output shaft 4. The commutators 13, 14 are designed to cover about a half of the circumference of the motor output shaft 4 and are separated from each other by predetermined gaps. The brushes 11, 12 have respective end portions having a surface area smaller than that of the commutators 13, 14 and are pressed against the respective commutators 13, 14 so that the brushes 11, 12 change their partner commutators 13, 14 as the motor output shaft 4 is rotated. Consequently, the direction of the electrical current supplied to the armature coil 8 is constantly inverted as the motor output shaft 4, and therefore the disc type rotor 5, is rotated. The brushes 11, 12 may be ordinary carbon brushes or metal brushes. The commutators 13, 14 are typically made of a conductive material having a small contact electrical resistance, such as Cu.

Figure 3:
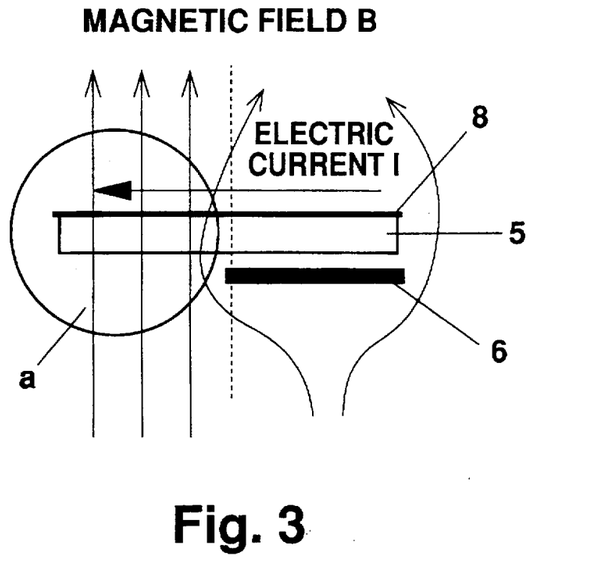
FIG. 3 is a schematic illustration of the magnetic field in the first embodiment.

With the above arrangement, a certain magnetic field is produced as a direct current is made to flow through the solenoid coil 3. Referring to FIG. 1, for example, an upward-directed magnetic field may be formed inside the bore of the solenoid coil 3. Then, the generated lines of magnetic force may pass through the disc type rotor 5 from the rear (down) side to the front (up) side. However, the path of the lines of magnetic force is blocked by the superconductor shield 6 so that the lines of magnetic force are compelled to detour the shield, as illustrated in FIG. 3.

Figure 4:
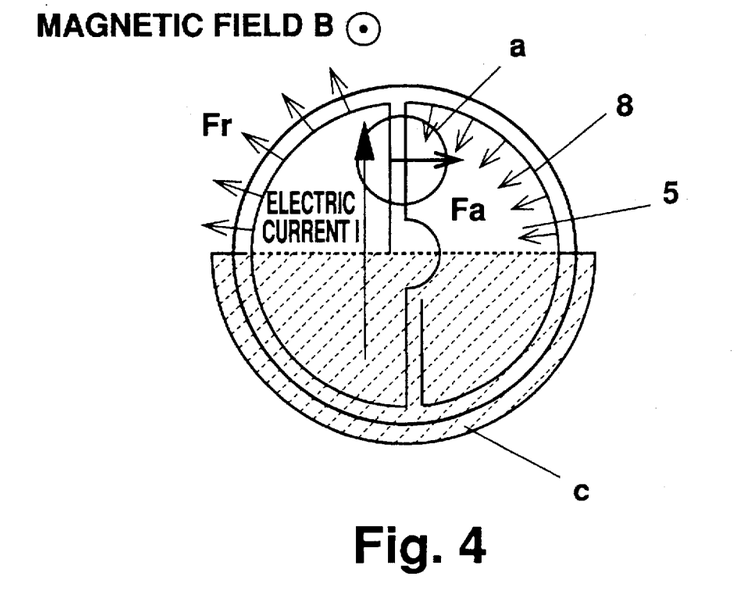
FIG. 4 is a schematic illustration showing how Lorentz force is generated in the first embodiment.

On the other hand, a certain electric current flows through the armature coil 8, and the brushes 11, 12 and the commutators 13, 14 are positionally so arranged that the electrical current running through the armature winding 8 is inverted when the radial portions of the armature winding 8 are made to run horizontally (laterally) in FIG. 2. Then, the electrical current always runs upward in FIG. 4 at the radial portions of the armature winding 8 so that the radial electrical current in the area not covered by the superconductor shield 6 is always directed from the center toward the periphery.

As the magnetic field B (directed from the rear side toward the front side of FIG. 4) and the electrical current I of the armature winding 8 are directionally defined, the portions of the armature winding 8 not covered by the superconductor shield 6 are subjected to Lorentz force of a magnitude determined as a function of the intensity of the electrical current running therethrough. Thus, a rightwardly directed rotary force Fa is applied to the radial electrical current I directed from the center toward the periphery according to Fleming's rule (left-hand rule), whereas a centripetal or centrifugal force is applied to the circumferential electrical current flowing counterclockwise or clockwise respectively. The force applied to the circumferential flow of electrical current is substantially offset so that the disc type rotor 5 is subjected only to the rightwardly (clockwise) directed rotary force. Since the electrical current fed to the armature winding 8 is switched as described above, the disc type rotor 5 is constantly subjected to a rightwardly directed rotary force to consequently drive the disc type rotor 5 to rotate so that the motor output shaft 4 produces a rotary force.

Figure 5:
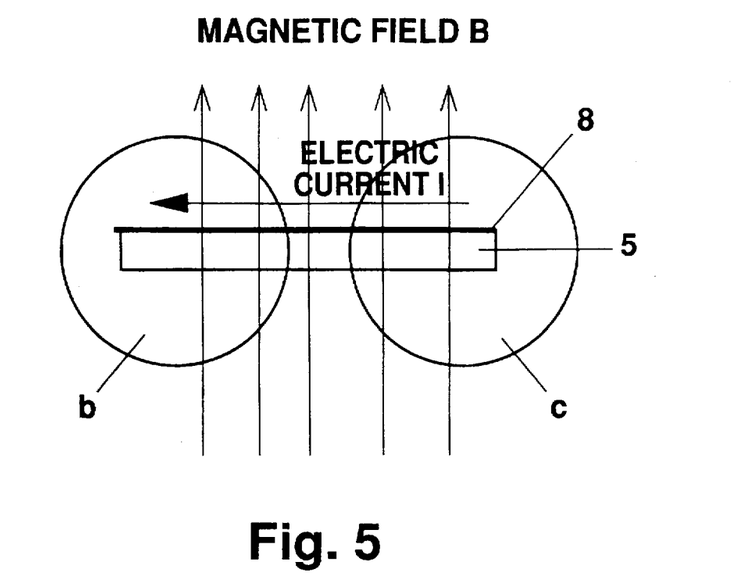
FIG. 5 is a schematic illustration of the lines of magnetic force in the first embodiment when the superconductor shield is taken away.
Figure 6:
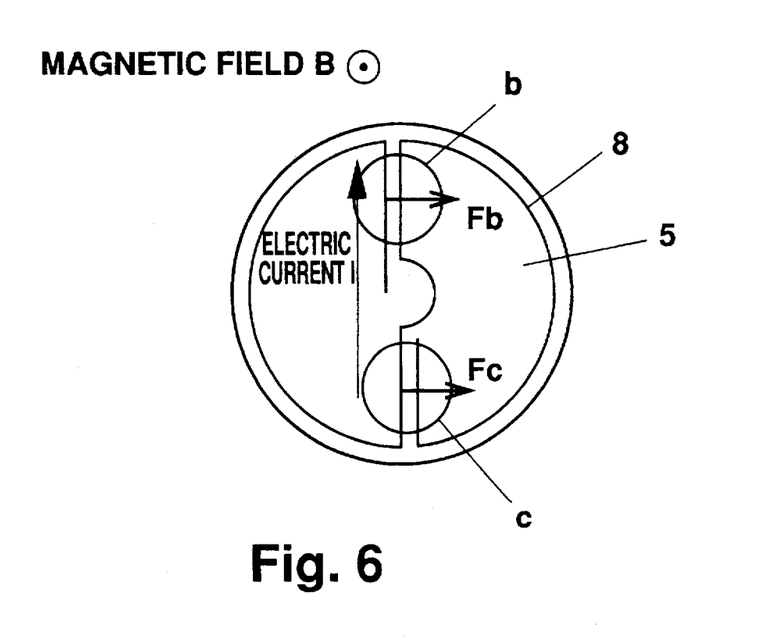
FIG. 6 is a schematic illustration of the Lorentz force of the first embodiment when the superconductor shield is taken away.

If the superconductor shield 6 is removed, the magnetic field B becomes evenly distributed to make the electrical current subject to both the rightwardly directed rotary force Fb and the leftwardly directed rotary force Fc, which offset each other so that consequently no rotary force will be obtained.

The output torque of the disc type rotor 5 can be increased by increasing the turns of the armature winding 8.

Thus, as described above with reference to the first embodiment of superconductor motor, a commutator type motor having a large power output can be realized in a simple manner by arranging a plurality of turns for the armature winding 8 on the disc type rotor 5, which is disposed inside the bore of the solenoid coil 3. If the solenoid coil 3 is made of a superconductive material, the superconductor motor will be more powerful. Additionally, a large number of turns can be selected for the armature winding 8 to raise the impedance of the armature winding 8 to make it possible to control the motor using high voltage low current signals. Since the embodiment requires the use of only a single brush and commutator unit, the overall configuration of the motor can be significantly simplified.

[2nd Embodiment]

Figure 7:
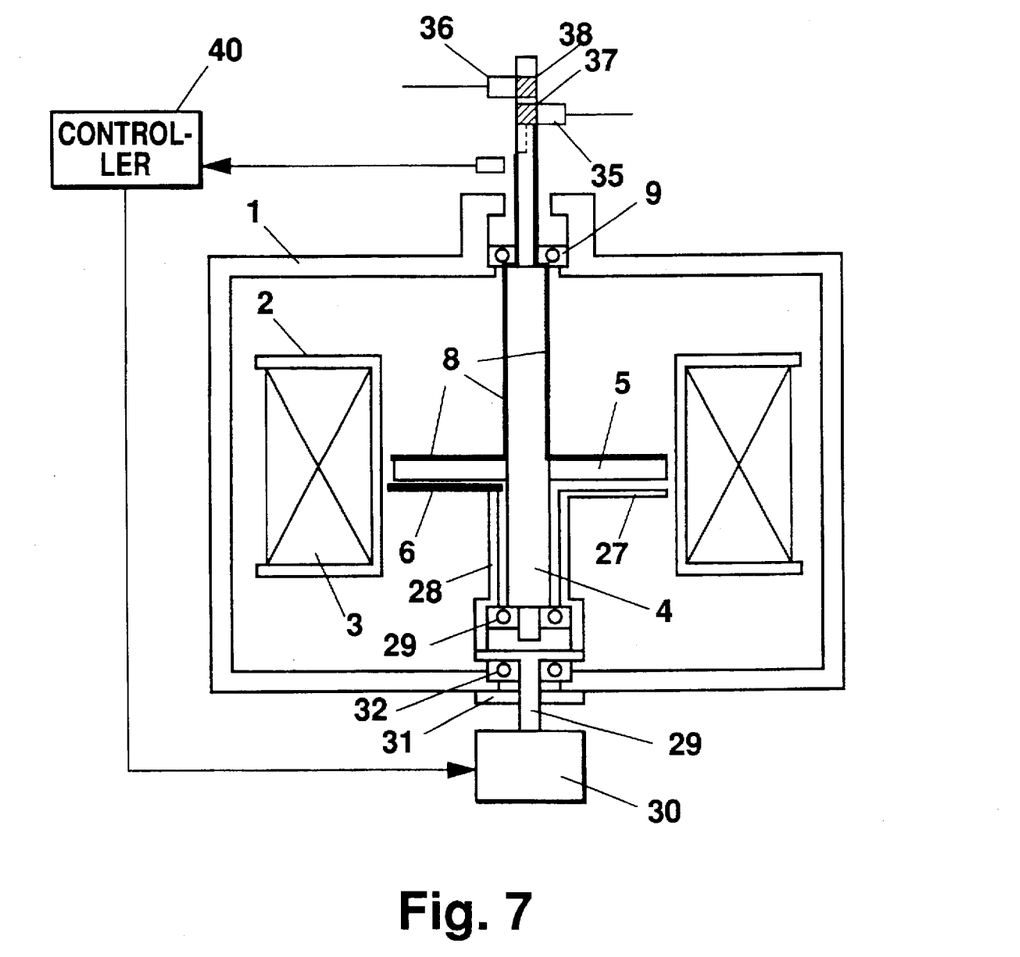
FIG. 7 is a schematic illustration of a second embodiment of the invention.

FIG. 7 shows a schematic illustration of a second embodiment of superconductor motor according to the invention. In this embodiment, the superconductor shield 6 is rotatable.

More specifically, the superconductor shield 6 is arranged on the surface of a stand 27, which is fitted to a cylindrical rotary shaft 28 that contains therein the motor output shaft 4. The rotary shaft 28 is connected to a motor by way of a rotary shaft 29 running through the bottom wall of the cryostat 1. Another rotary shaft 29 is provided and rotatably supported by the cryostat 1 by way of a bearing 32. A seal 31 typically made of Teflon is arranged at the bore where the rotary shaft 29 runs through to seal the bottom of the cryostat 1. The lower end of the motor output shaft 4 is connected to the rotary shaft 28 by way of a bearing 33 on the inside of the rotary shaft 28.

A pair of collector brushes 35, 36 are arranged so as to force each other at a top portion of the shaft, and are held in contact with respective collector rings 37, 38. The collector rings 37, 38 are connected to the opposite ends of the armature winding 8 so that the electrical current always runs through the armature winding 8 in a predetermined direction. Both the collector rings 37, 38 have an annular profile adapted to cover the outer periphery of the motor output shaft from outside and are connected to the opposite ends of the armature winding 8.

A rotary position sensor 39 is arranged in the vicinity of the motor output shaft 4 in order to detect the rotary position of the motor output shaft 4. The signal representing the detected position is fed to a controller 40, which controls the rotation of the motor 30 as a function of the signal fed from the rotary sensor 39.

Figure 8:
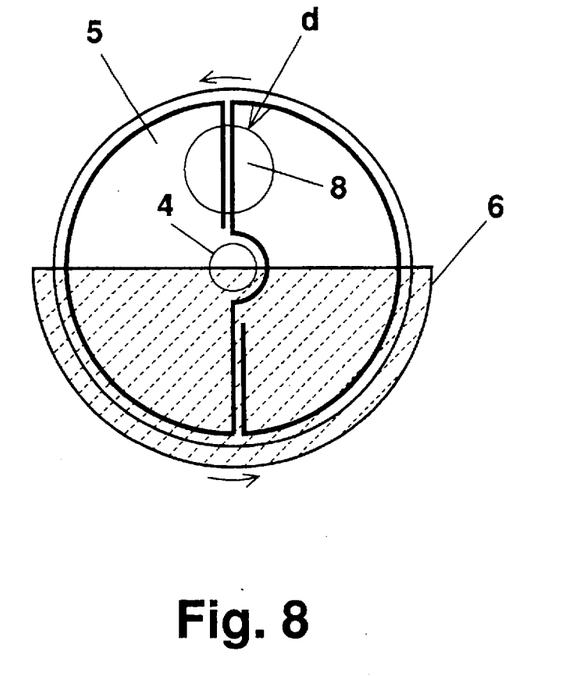
FIG. 8 is a schematic illustration of the armature coil and the superconductor shield of the second embodiment.

In the second embodiment having a configuration as described above, the controller 40 positionally controls the superconductor shield 6 such that it is constantly held at the position as shown in FIG. 8. Thus, although an electrical current is made to flow through the armature winding 8 constantly in a given direction, the portions of the armature winding 8 not covered by the superconductor shield 6 allow a constant and one-directional flow of electrical current to take place. Now, an electrical current flows either constantly from the center toward the periphery or from the periphery toward the center in the radially arranged portions of the armature winding 8 not covered by the superconductor shield 6. Thus, the disc type rotor 5 is always subjected to a rotary force trying to rotate it constantly in a predetermined direction, produced by the radial electric current.

The above described embodiment can be made as small and powerful as the first embodiment. Additionally, since annular commutator rings are used, the brush and commutator unit can be made to have a even simpler overall configuration. Since the rotation of the motor 30 only has to be synchronized with that of the disc type rotor 5, the control operation of the controller 40 may be very simple. Finally, a photoelectric encoder or some other simple device may be used for the rotary position sensor 39.

[3rd Embodiment]

Figure 9:
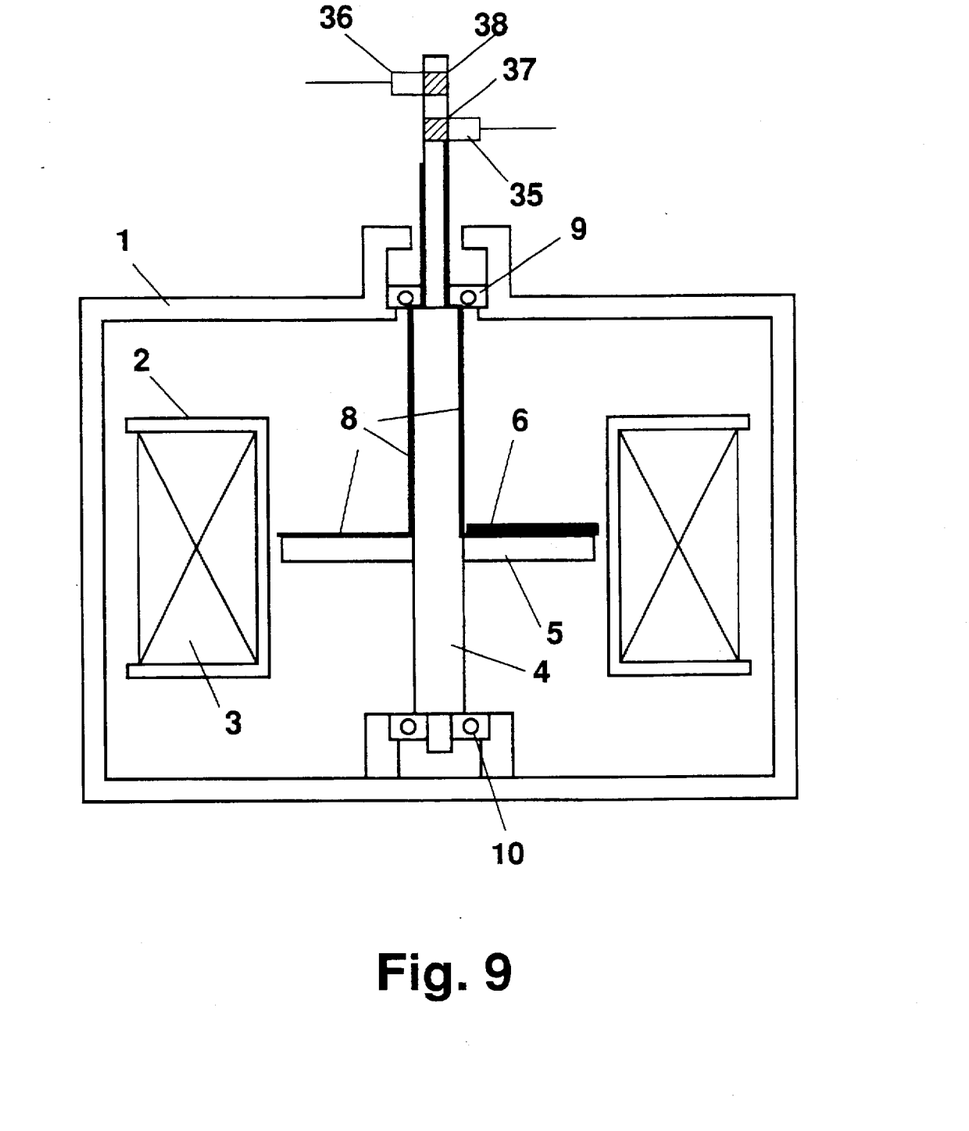
FIG. 9 is a schematic illustration of a third embodiment of the invention.

FIG. 9 is a schematic illustration of a third embodiment of the invention. Here, the superconductor shield 6 is laid on the disc type rotor 5. More specifically, the superconductor shield 6 is arranged on the armature winding 8 which is located on the disc type rotor 5, so that the superconductor shield 6 covers half of the disc type rotor 5. Thus, as in the case of the second embodiment, the electrical current flowing through the armature winding 6 is subjected to a rotary force directed constantly in a predetermined direction if the disc type rotor 5 rotates. This third embodiment has a specially simple configuration and operates as effectively as the second embodiment.

[4th Embodiment]

Figure 10:
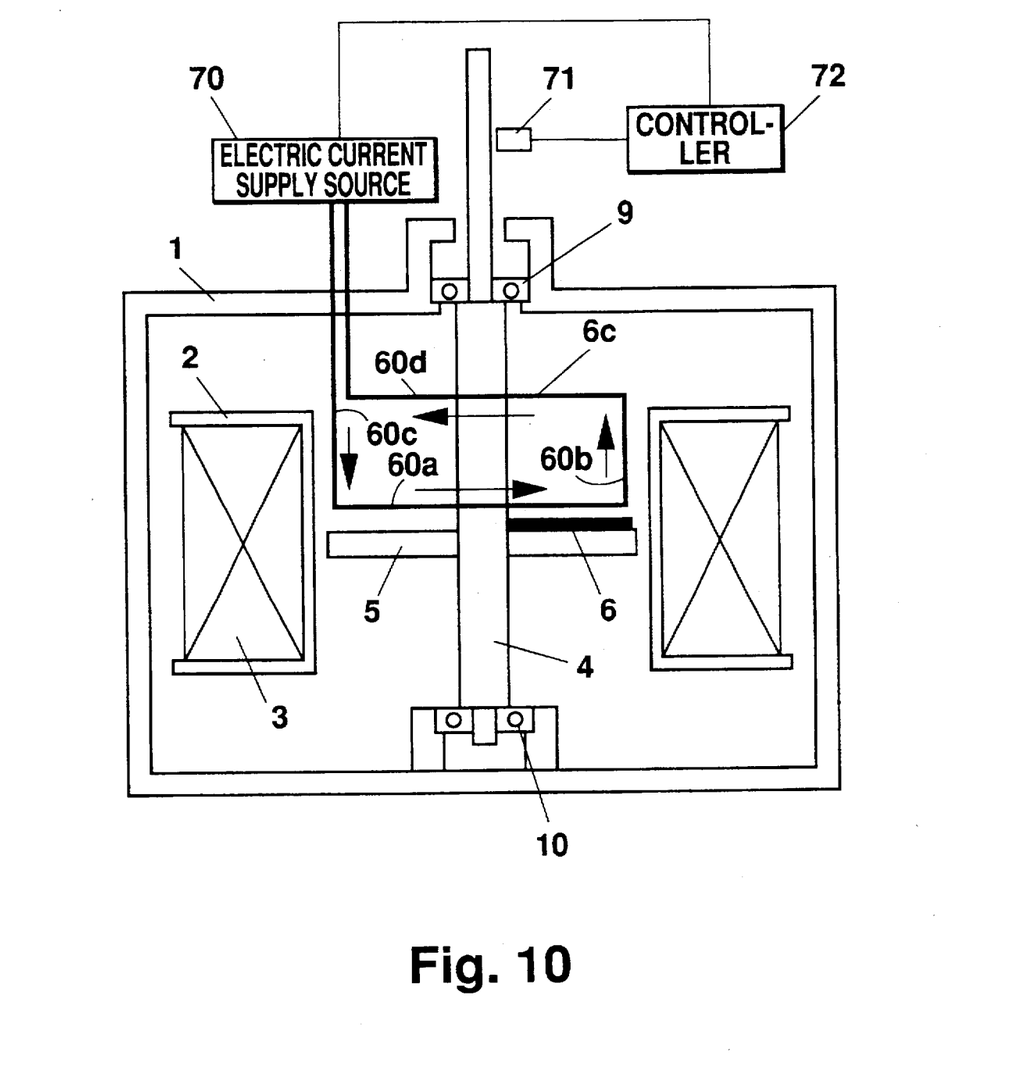
FIG. 10 is a schematic illustration of a fourth embodiment of the invention.
Figure 11:
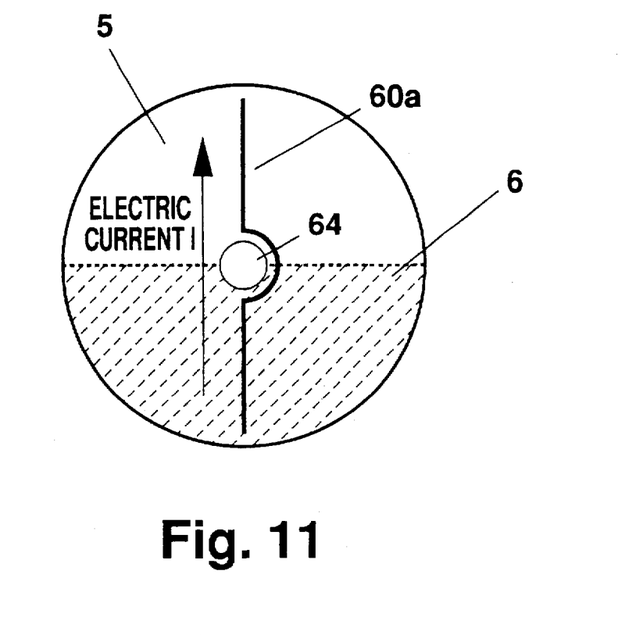
FIG. 11 is a schematic illustration of the stationary coil and the superconductor shield of the fourth embodiment.

FIG. 10 is a schematic illustration of a fourth embodiment. In this embodiment, the armature winding is replaced by a stationary drive coil 60 and only the superconductor shield 6 is arranged on the disc type rotor 5. More specifically, the superconductor shield 6 is so arranged as to cover half of the disc type rotor 5, as shown by a shaded area in FIG. 11. The stationary drive coil 60 is securely arranged in the space above and independently from the disc type rotor 5. As shown in FIG. 11, the stationary drive coil 60 has a radial path 60a near the surface of the disc type rotor 5, which is then extended upward from the opposite ends to form paths 60b, 60c, of which the path 60b shown to the right in FIG. 10 is bent to become another path 60d that is arranged in parallel with the path 60a. Thus, the stationary drive coil 60 has a rectangular form as a whole. The stationary drive coil 60 is then connected to a electrical current supply source 70 and an electrical current is made to flow sequentially through the paths 60d, 60b, 60a and 60c or, conversely, through the paths 60c, 60a, 60b and 60d. The stationary drive coil 60 is typically made of Al or Cu and has a certain degree of strength, although it may be reinforced by means of FRP if necessary.

A rotary position sensor 71 is arranged in the vicinity of the motor output shaft 4 and the signal representing the detected rotary position of the motor output shaft 4 is fed to a controller 72, which controls the electrical current supply source 70 as a function of the signal fed to it, to switch the direction of the electrical current flowing through the stationary drive coil 60.

More specifically, when the disc type rotor 5 is driven to rotate, the controller 72 controls the electrical current supply source 70 such that the electrical current flowing through the path 60a of the stationary drive coil 60 located close to the portion of the disc type rotor 5 not covered by the superconductor shield 6 is always directed from the periphery toward the center, or from the center toward the periphery.

For example, the electrical current supply source 70 is so controlled as to supply an electrical current flowing through the path 60 of the stationary drive coil 60 from the bottom toward the top when the superconductor shield 6 is located at a lower position in FIG. 11 (and conversely from the top toward the bottom when the superconductor shield 6 is located at an upper position). If a magnetic field is applied and directed from the top toward the bottom within the bore (or from the rear side toward the front side of FIG. 11), the path 60a of the stationary drive coil 60 not covered by the superconductor shield 6 is subjected to a rotary force directed clockwise.

However, since the stationary drive coil 60 is rigidly secured in this embodiment, it cannot rotate. On the other hand, an electrical current also flows in the superconductor shield 6 in the vicinity of the path 60a of the stationary drive coil 60 and directed constantly from the periphery toward the center in FIG. 11. If the superconductor shield 6 does not exist, a rotary force directed counterclockwise would be applied to the path 60a.

However, the lines of magnetic force cannot pass through the superconductor shield 6 and the path 60 is not subjected to a rotary force that is directed counterclockwise.

The magnetic field and the electrical current of the embodiment have a relationship roughly as described above. It has been generally believed that, if such a relationship exists, a rotary force that would drive the type rotor 5 to rotate would not be generated. However, it has been confirmed that the disc type rotor 5 actually rotates, when such an electrical current is made to flow through the solenoid coil 3 and the stationary drive coil 60 of this embodiment. In this embodiment, the disc type rotor 5 rotates clockwise.

The underlying law governing this rotary motion is not known yet. However, the inventors of the present invention have assumed that the magnetic field generated by the solenoid coil 3 and the magnetic field generated by the electrical current flowing through the stationary drive coil 60 in an area close to the superconductor shield 6 are offset by each other so that consequently a rotary force trying to drive the superconductor shield 6 is produced there. Thus, in the case of FIG. 11, a rotary force directed counterclockwise is applied to a lower half of the path 60a where there is no superconductor shield 6 but the rotary force does not affect the path 60a when the superconductor shield 6 is positioned, so that the superconductor shield 6 is subjected to a rotary force trying to rotate it clockwise in an attempt to equalize the two conditions.

While no theoretical support has been provided for this assumption to date, it has been proved by experiments that the disc type rotor 5 is driven to rotate in the superconductor motor of the fourth embodiment.

(Experiment)

Figure 12:
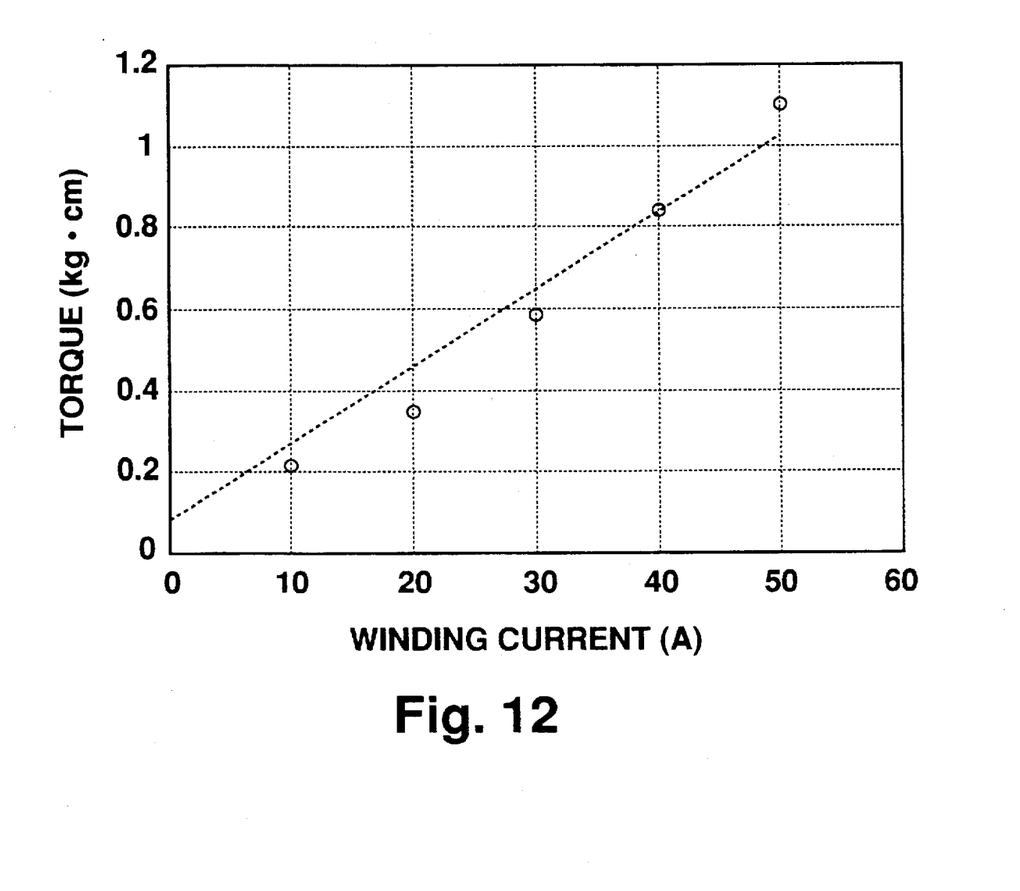
FIG. 12 is a graph showing the relationship between the electric current of the stationary coil

In an experiment, an electrical current (winding current) was made to flow through the stationary drive coil 60 in a motor having a configuration equivalent to that of FIG. 10, to prove that a torque (starting torque) proportional to the intensity of the winding current was generated as shown in FIG. 12.

This experiment was conducted under the following conditions. The solenoid coil 3 had an inner diameter of 197 mm, an outer diameter of 207 mm, a width (vertical length in FIG. 10) of 100 mm and a number of turns of 680. An electrical current of 20 A was supplied to the coil. The number of turns of the stationary drive coil 60 was 30, and the disc type rotor had a diameter of 160 mm.

As evidenced by the above experiment, the fourth embodiment of superconductor motor can produce a rotary force on the motor output shaft 4.

With the fourth embodiment, the superconductor motor can be down sized and can produce a high power. What is particularly noticeable about this embodiment is that both the solenoid coil 3 and the stationary drive coil 60 are rigidly secured. In other words, the disc type rotor 50 can be driven to rotate by feeding the two stationary coils with electrical current. Since the motor output shaft 4 does not require the use of a brush and commutator unit including commutator rings, the overall configuration of the motor can be further simplified.

[5th Embodiment]

Figure 13:
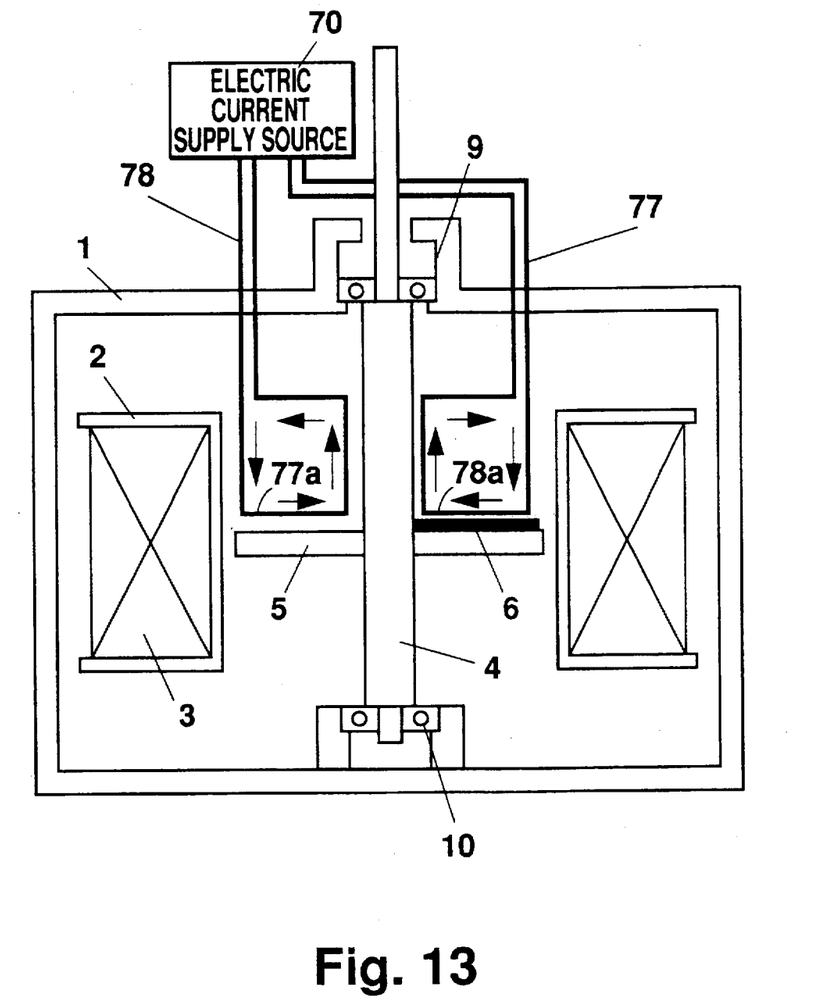
FIG. 13 is a schematic illustration of a fifth embodiment of the invention.
Figure 14:
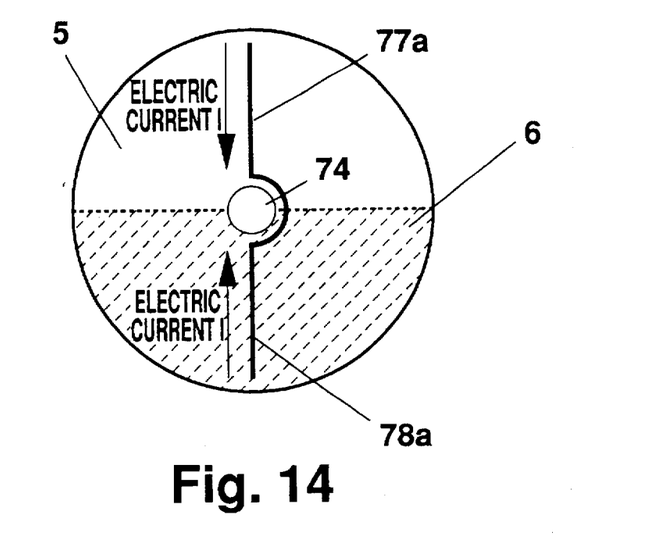
FIG. 14 is a schematic illustration of the stationary coil and the superconductor shield of the fifth embodiment.

FIG. 13 is a schematic illustration of a fifth embodiment. This embodiment is realized by replacing the stationary drive coil 60 of the fourth embodiment by a pair of stationary drive coils 77, 78. These stationary drive coils 77, 78 are rectangular coils if viewed laterally from paths 77a, 78a running along the upper surface of the disc type rotor 5.

An electrical current is made to flow radially though each of the paths 77a, 78a of the two stationary drive coils 77, 78, either toward the center or toward the periphery. In FIG. 13, an electrical current flows radially toward the center in each of the paths 77a, 78a of the stationary drive coils 77, 78. Therefore, if the disc type rotor 5 is driven to rotate, the electrical currents running through the paths 77a, 78a located directly above the disc type rotor 5 are constantly directed toward the center. This means that the directions of the electrical currents respectively running through the paths 77a, 78a do not have to be switched and the electrical currents are made to flow through the respective stationary drive coils 77, 78 constantly in the same directions in order to generate forces that are directed oppositely and invertedly relative to the directions of the respective electrical currents, to consequently drive the disc type rotor 5 to rotate. If the electrical current flowing through the solenoid coil 3 produces a magnetic field within the bore that is directed from the bottom toward the top, and the electrical currents running through the paths 77a, 78a are directed toward the center (or toward the periphery), the disc type rotor 5 is driven to rotate clockwise.

[6th Embodiment]

Figure 15:
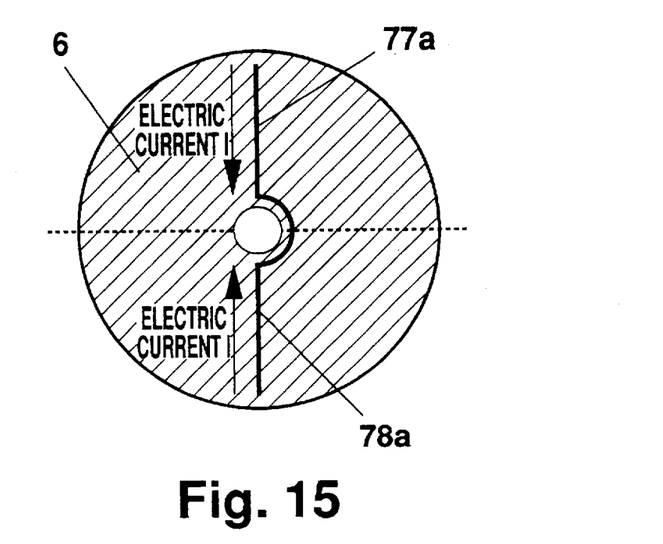
FIG. 15 is a schematic illustration of a sixth embodiment.
Figure 16:
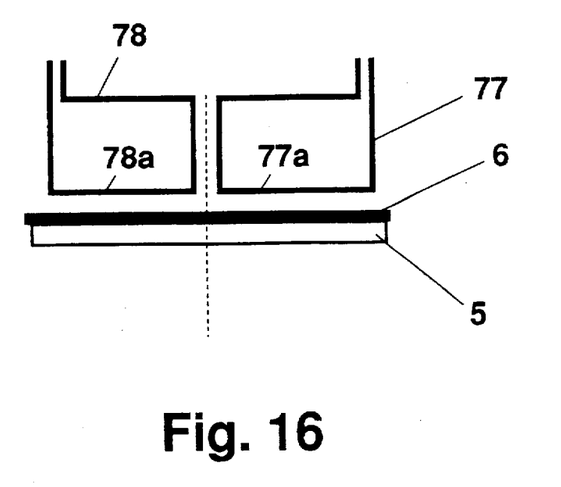
FIG. 16 is a schematic illustration of the stationary coil and the superconductor shield of a sixth embodiment.

FIGS. 15 and 16 schematically illustrate a sixth embodiment of the invention. In this embodiment, the superconductor shield 6 is designed to cover the entire upper surface of the disc type rotor 5. A pair of stationary drive coils 77, 78 are arranged in the vicinity of the superconductor shield 6 as in the case of the sixth embodiment. Thus when electrical currents are made to flow respectively through the paths 77a, 78a of the two stationary drive coils and directed toward the center, and the solenoid coil 3 is so operated as to generate a magnetic field directed from the bottom toward the top within the bore, forces that repel each other are generated in the superconductor shield 6 in an area close to the paths 77a, 78a to consequently drive the disc type rotor 5 to rotate clockwise. Since a torque is generated by electrical current respectively flowing through the stationary drive coils 77, 78 in this embodiment, the motor produces its output even more efficiently.

[7th Embodiment]

Figure 17:
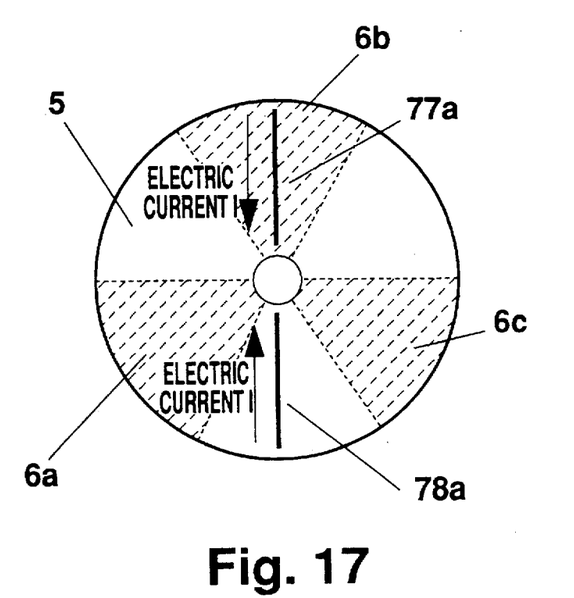
FIG. 17 is a schematic illustration of the relationship between the electric current of the stationary coil and the superconductor shield of a seventh embodiment.
Figure 18:
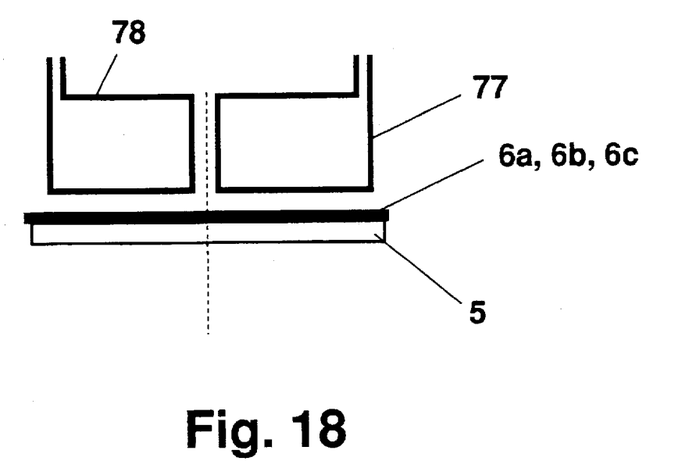
FIG. 18 is a schematic illustration of the stationary coil and the superconductor shield of the seventh embodiment.

FIGS. 17 and 18 schematically illustrate a seventh embodiment of the invention. In this embodiment, the superconductor shield 6 is divided into a plurality of sections on the surface of the disc type rotor 5. More specifically, the superconductor shield 6 is divided into three sectors 6a, 6b, 6c, which are separated from each other by a given gap (or by 60°) and arranged evenly. With this arrangement, again, the sectors 6a, 6b, 6c of the superconductor shield are subjected to forces that repel each other, due to the electrical currents running through the stationary drive coils 77, 78 to drive the disc type rotor 5 to rotate.

Figure 19:
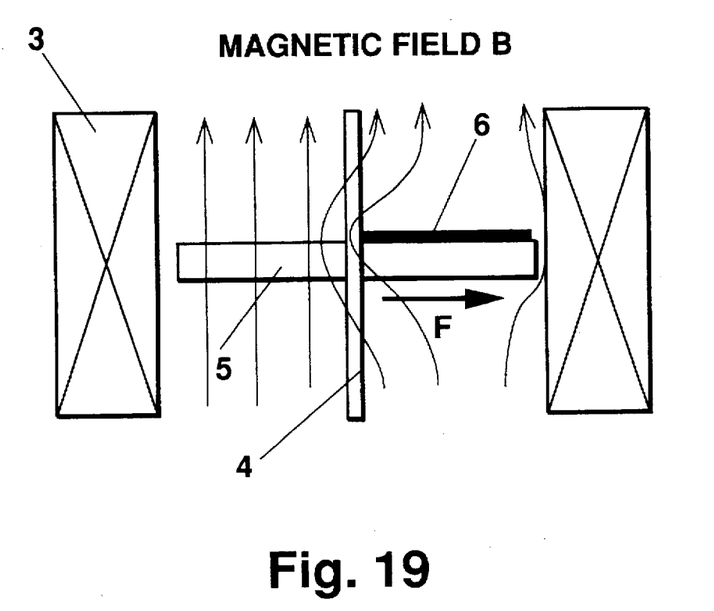
FIG. 19 is a schematic illustration showing the relationship between a superconductor shield and lines of magnetic force.

This seventh embodiment can effectively prevent the motor output shaft 4 from swerving. When a half of the disc type rotor 5 is covered by a superconductor shield 6, as in the case of the fifth embodiment, the lines of magnetic force detour around the superconductor shield 6 to deform the magnetic field generated by the solenoid coil 3, as shown in FIG. 19. In areas where lines of magnetic force are dense, there arises a force trying to spread the lines. Thus, in the case of FIG. 19, the disc type rotor 5 is used outwardly in the area where the superconductor shield 6 is arranged. This force trying to push the disc type rotor 5 outwardly also tries to deflect the motor output shaft 4. However, with the seventh embodiment, such a force is divided to prevent any harmful effect from taking place.

Note also that the sixth embodiment is equally effective for preventing the motor output shaft from wobbling because the lines of magnetic force generated by the solenoid coil 3 are evenly distributed relative to the motor output shaft.

[8th Embodiment]

Figure 20:
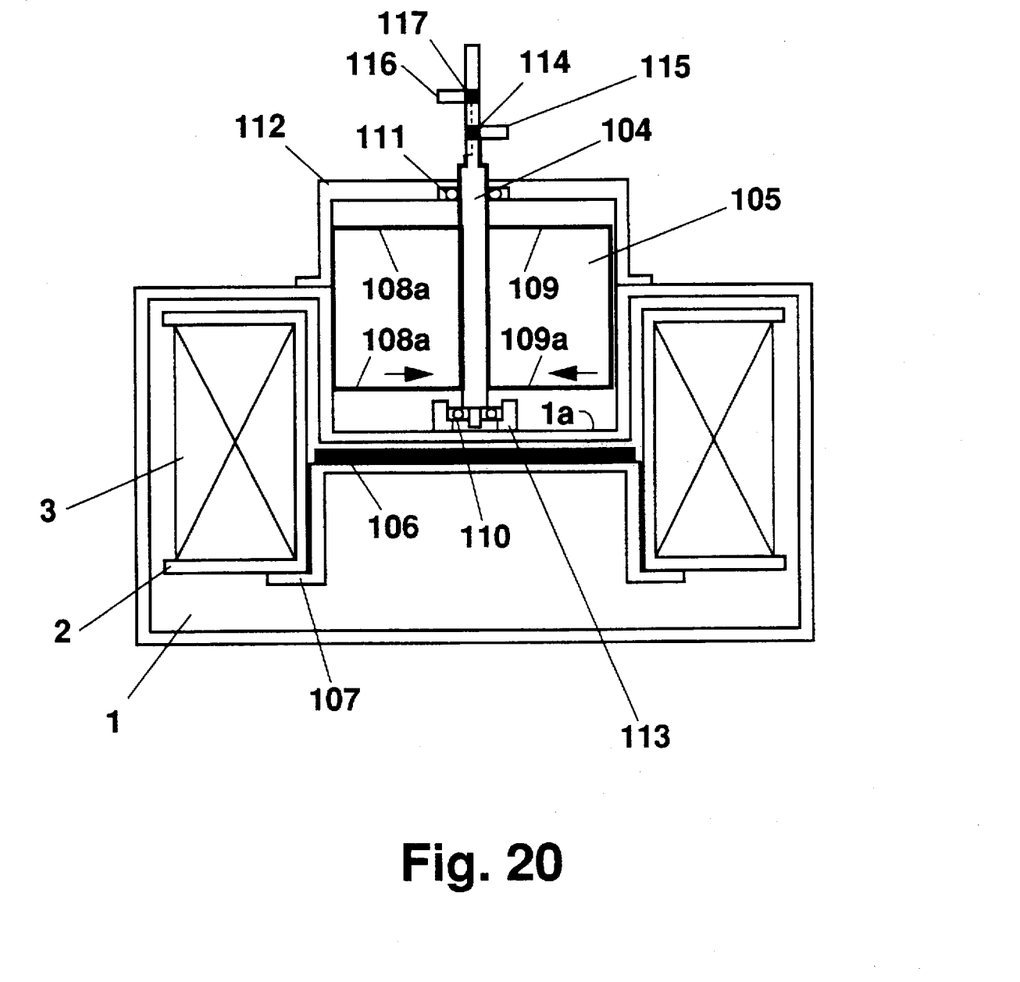
FIG. 20 is a schematic illustration of an eighth embodiment of the invention.

FIG. 20 is a schematic illustration of an eighth embodiment of the invention. In this embodiment, the rotor unit is arranged outside the cryostat 1. The cylindrical rotor 105 of this embodiment is provided with a pair of rectangular armature coils 108, 109 configured like the stationary drive coils of the preceding embodiments. The cylindrical rotor 105 is typically made of FRP and the top of the cylindrical rotor 105 projects from the top of the solenoid coil 3. A motor output shaft 4 is arranged at the center of the cylindrical rotor 10, which is in turn rigidly secured to the motor output shaft 4. A pair of commutator rings 114, 116 and corresponding collector brushes 115, 117 are arranged at an upper portion of the motor output shaft 4, the collector rings 114, 116 being respectively held in contact with the collector brushes 115, 117. As in the case of the preceding embodiments, electrical currents are fed from a given electrical current supply source (not shown) to the armature coils 108, 109 by way of the respective brushes 115, 117 at a given intensity so that the electrical currents are made to flow through paths 108a, 109a of the armature coils 108, 109 located at lower positions of the armature coils in the directions toward the center (or toward the periphery).

The cryostat 1 is provided on the top thereof with a recess 1a for receiving the cylindrical rotor 105 and a bearing 110 is arranged at the center of the recess and carries the bottom of a motor output shaft 104. A stand 112 is arranged above the cylindrical rotor 105 and a bearing 111 arranged there carries an upper portion of the cylindrical rotor 105 of the motor output shaft 104.

A superconductor shield anchoring stand 107 is arranged under the recess 1a of the cryostat 1 and a superconductor shield 106 is rigidly secured to the superconductor shield anchoring stand 107. The superconductor shield 106 has a profile similar to that of the superconductor shield shown in FIG. 17, and is divided into three sectors that are separated by a gap of 60°.

With the embodiment having a configuration as described above, a certain magnetic field directed from the bottom toward the top (or from the top toward the bottom) is generated within the bore when an electrical current is made to flow through the solenoid coil 3. Since the sectors of the superconductor shield 106 have a center angle of 60° and are separated by a gap of 60°, either one of the armature coils 108, 109 is located on one of the sectors of the superconductor shield 106, and the other armature coil 109 or 108 is located on an area devoid of the superconductor shield. Since electrical currents directed toward the center (or toward the periphery) are made to run constantly through respective paths 108a, 109a of lower portions of the armature coils 108, 109 located within the bore, the path 108a or 109a located in an area devoid of the superconductor shield 106 is subjected to a Lorentz force that tries to rotate the cylindrical rotor 105 counterclockwise. Thus, the cylindrical rotor 105 is driven to rotate by the Lorentz force. Note that upper portions of armature coils 108, 109 allow respective electrical current to flow therethrough that are reversely directed relative to the electrical currents flowing the upper portions 108a, 109a of the armature coils 108, 109, to generate a reversely directed Lorentz force. However, since the upper paths are located outside the bore of the solenoid coil 3, they are not affected by the force and the rotary motion of the cylindrical rotor 105 is not significantly affected by it.

With this embodiment, only the superconductor shield 106 and the solenoid coil 3 are housed in the cryostat 1 to hold them in a superconductive state. On the other hand, the cylindrical rotor 105 is arranged outside the cryostat 1 and the armature coils 108, 109 are ordinary conductive coils. Thus, the cooling agent contained in the cryostat 1 is prevented from being stirred and hence is protected against any possible temperature rise so that the rate of consumption (evaporation) of the cooling agent can be reduced. Additionally, electrical currents can be made to flow constantly in a given direction through the lower paths 106a, 107a because of the provision of a cylindrical rotor 105, so that collector rings can be used for a collector unit to simplify the overall construction.

Note that the rotor does not necessarily have to be cylindrical, and disc type rotor such as the one of the first embodiment may alternatively be used.

[Other Possible Arrangements]

While the solenoid coil 8 is a superconductor coil in each of the above embodiments, it may be replaced by an ordinary conductive coil. If such is the case, only the superconductor shield 6 has to be contained in the cryostat 1 and cooled. The superconductor solenoid coil 8 and the superconductor shield 6 may be made of an yttrium type material. Any cooling agent may be used for the purpose of the present invention, if it is appropriate for producing and maintaining a superconductive state. A freezing machine may be used to directly produce a superconductive state.

Note that throughout the drawings, those components that are similar to those of the preceding embodiments are denoted by the same reference symbols and their descriptions are omitted.

What is claimed is:

1. A superconductor motor comprising:
   a solenoid coil for generating a magnetic field within the bore of the solenoid coil as a result of an electrical current flowing through the coil,
   a rotor arranged in the bore of the solenoid coil,
   a superconductor shield partly covering the surface of said rotor,
   a stationary drive coil partly arranged close to the superconductor shield to cause an electrical current to flow in a radial direction,
   an electric current supply for supplying said electrical current to said stationary drive coil, and wherein
   said stationary drive coil has a first radial section directed from the center of the rotor toward the periphery thereof, second and third sections extending upward from the respective opposite ends of the first section and a fourth section running in parallel with the first section to form a rectangular winding.

2. A superconductor motor according to claim 1, wherein said superconductor shield is symmetrically arranged relative to the rotary shaft of the rotor.

3. A superconductor motor comprising:
   a solenoid coil for generating a magnetic field within the bore of the solenoid coil as a result of an electrical current flowing through the coil,
   a rotor arranged in the bore of the solenoid coil,
   a superconductor shield partly covering the surface of said rotor,
   a stationary drive coil partly arranged close to the superconductor shield to cause an electric current to flow in a radial direction, and
   said stationary drive coil having a first radial section directed from the center of the rotor toward the periphery thereof, second and third sections extending upward from the respective opposite ends of the first section and a fourth section running in parallel with the first section to form a rectangular winding.

4. A superconductor motor according to claim 3, wherein said superconductor shield is symmetrically arranged relative to the rotary shaft of the rotor.

5. A superconductor motor comprising:
   a solenoid coil for generating a magnetic field within a bore of the solenoid coil as a result of an electrical current flowing through the coil,
   a rotor arranged in the bore of the solenoid coil,
   an armature winding arranged on the rotor,
   a superconductor shield partly covering the armature winding,
   the superconductor shield being arranged independently from the rotor at a position where the armature winding being partly covered, and
   the superconductor shield being arranged in a cryostat for maintaining a predetermined low temperature state and the armature winding being arranged outside of the cryostat.

6. A superconductor motor according to claim 5, wherein the armature winding is an ordinary conductive winding.

7. A superconductor motor comprising:
   a sealed cryostat,
   means mounted within the cryostat for establishing a magnetic field having lines of magnetic force,
   a rotor mounted for rotation within the magnetic field,
   a superconductor shield within the cryostat partly blocking the lines of magnetic force from the surface of said rotor,
   a stationary drive coil mounted close to but out of contact with rotor and superconductor shield to cause an electrical current to flow in a radial direction, and
   an electric current supply for supplying said electrical current to said stationary drive coil.

* * * * *